US012702603B2

(12) United States Patent
Dominguez et al.

(10) Patent No.: US 12,702,603 B2
(45) Date of Patent: Aug. 11, 2026

(54) ADJUSTABLE SEAT SLING FOR A WHEELCHAIR

(71) Applicant: PERMOBIL, INC., Lebanon, TN (US)

(72) Inventors: Andrew Dominguez, Thompson Station, TN (US); Debra Masters, Longhorne, PA (US); Jared Rixon, Port Orchard, WA (US); Merritt Penticoff, Nashville, TN (US)

(73) Assignee: PERMOBIL, INC., Lebanon, TN (US)

( * ) Notice: Subject to any disclaimer, the term of this patent is extended or adjusted under 35 U.S.C. 154(b) by 106 days.

(21) Appl. No.: 18/603,570

(22) Filed: Mar. 13, 2024

(65) Prior Publication Data

US 2025/0288476 A1 Sep. 18, 2025

(51) Int. Cl.
*A61G 5/10* (2006.01)

(52) U.S. Cl.
CPC .................................. *A61G 5/1045* (2016.11)

(58) Field of Classification Search
CPC .......... A47C 7/22; A47C 7/28; A61G 5/1062; A61G 5/1064
See application file for complete search history.

(56) References Cited

U.S. PATENT DOCUMENTS 3,695,706 A * 10/1972 Basher ..................... A47C 7/22 297/452.56
4,592,570 A 6/1986 Nassiri
4,953,913 A * 9/1990 Graebe ................ A61G 5/1045 297/452.25
5,088,747 A 2/1992 Morrison et al.
5,106,152 A 4/1992 Ward, Sr. et al.
5,121,938 A 6/1992 Gross et al.
6,536,791 B1 * 3/2003 Adams ..................... A47C 7/22 297/452.64
6,733,074 B2 5/2004 Groth
7,246,821 B2 7/2007 Sato
7,374,189 B1 5/2008 Adams
7,914,081 B1 3/2011 Smith
8,960,699 B2 2/2015 Sprigle et al.
10,595,639 B2 3/2020 Dufresne
2001/0011805 A1 8/2001 Kueschall
(Continued)

FOREIGN PATENT DOCUMENTS

EP 1920746 A2 * 5/2008 ........... A61G 5/0825

*Primary Examiner* — Richard Green
(74) *Attorney, Agent, or Firm* — Michael Best & Friedrich LLP

(57) ABSTRACT

A sling seat assembly for a wheelchair includes a sling including a sitting surface, a first mounting portion positioned adjacent to the sitting surface, and a plurality of straps extending from the sitting surface, and a second mounting portion includes a plurality of rings, each of the plurality of rings is configured to receive one of the plurality of straps. The sling is formed of a laminate structure such that the sitting surface, first mounting portion, and the plurality of straps are defined by a first material, the plurality of straps further includes a second material fastened to the first material, and the sitting surface includes a third material fastened to the first material, the first, second and third materials being different materials, and each strap is configured to removably fasten to a respective portion of the sitting surface.

20 Claims, 7 Drawing Sheets

(56) References Cited

U.S. PATENT DOCUMENTS

| | | | | |
|---|---|---|---|---|
| 2004/0016453 A1* | 1/2004 | Mills | A61H 3/00 | 135/66 |
| 2010/0025969 A1* | 2/2010 | Kent | A61G 5/1062 | 280/647 |
| 2012/0126513 A1* | 5/2012 | Kent | A61G 5/1062 | 280/650 |
| 2022/0142834 A1* | 5/2022 | Hamilton | A61G 5/1091 | |

* cited by examiner

ADJUSTABLE SEAT SLING FOR A WHEELCHAIR

FIELD

The present disclosure relates to a wheelchair. More specifically, the present disclosure relates to a seat sling for a wheelchair and a process for manufacturing the seat sling.

BACKGROUND

Wheelchairs are generally known in the art. Wheelchairs generally include, among other elements, a frame assembly, and a seat. A seat generally supports a wheelchair user. The seat can include a solid seat insert or an upholstered sling seat. Known seat slings are generally manufactured using cut and sew operations to fit to a specific shape and size of a user. This can lead to difficulties for customization to account for different sized wheelchair users. For example, known customized seat slings can require a specialized, custom order length and width. This can result in substantial time delays associated with the manufacturing of the customized seat sling. Alternatively, to reduce the time delay, a large inventory of different sized seat slings can be produced. However, this can lead to certain sizes not being used. Accordingly, there is a need for a seat sling and related manufacturing method that allows for improved adjustability and customization while reducing time delays associated with manufacturing of customized sizes.

SUMMARY

In one example of an embodiment, a sling seat assembly for a wheelchair includes a sling including a sitting surface, a first mounting portion positioned adjacent to the sitting surface, and a plurality of straps extending from the sitting surface, and a second mounting portion includes a plurality of rings, each of the plurality of rings is configured to receive one of the plurality of straps. The sling is formed of a laminate structure such that the sitting surface, first mounting portion, and the plurality of straps are defined by a first material, the plurality of straps further includes a second material fastened to the first material, and the sitting surface includes a third material fastened to the first material, the first, second and third materials being different materials, and each strap is configured to removably fasten to a respective portion of the sitting surface.

In another example of an embodiment, the first mounting portion is defined by the sling.

In another example of an embodiment, the first mounting portion defines a pocket configured to receive a first mounting rail.

In another example of an embodiment, the pocket is defined by a portion of the first mounting portion folding onto a second portion of the first mounting portion.

In another example of an embodiment, the first mounting portion defines a plurality of connection apertures, and a first mounting rail defines a plurality of rail apertures, each rail aperture is configured to align with one of the plurality of connection apertures and receive a fastener configured to engage a frame member of the wheelchair.

In another example of an embodiment, the second mounting portion defines a cavity configured to receive a second mounting rail.

In another example of an embodiment, the second mounting portion defines a plurality of connection apertures, and the second mounting rail defines a plurality of rail apertures, each rail aperture is configured to align with one of the plurality of connection apertures and receive a fastener configured to engage a frame member of the wheelchair.

In another example of an embodiment, the second material is configured to removably attach to the third material to removably fasten each strap to the sitting surface.

In another example of an embodiment, the second material is one of a hook or loop material, and the third material is the other of the loop or hook material.

In another example of an embodiment, the second material is adhesively fastened to the first material, and the third material is adhesively fastened to the second material.

In another example of an embodiment, the first mounting portion is positioned on a first edge of the sitting surface and the plurality of straps extend from a second edge of the sitting surface, opposite the first edge.

In another example of an embodiment, the sling defines a first depth, and each strap defines a segment, the segments being oriented perpendicular to the first depth, each segment including a portion of the sitting surface and a portion of the first mounting portion.

In another example of an embodiment, each segment is configured to be permanently removed from the sling to reduce a depth of the sling.

In another example of an embodiment, each strap defines a plurality of segments.

In another example of an embodiment, in response to the permanent removal of each segment, the sling depth decreases from the first depth to a second depth.

In another example of an embodiment, the sling defines a width, the width is adjustable in response to a removably fastened position of each strap relative to the respective portion of the sitting surface.

In another example of an embodiment, a method of manufacturing a seat sling assembly includes forming a laminate structure including a first material, a second material fastened to the first material, and a third material fastened to the first material, the first, second and third materials being different materials, and cutting the laminate structure to form a sling including a sitting surface, a first mounting portion positioned adjacent to the sitting surface, and a plurality of straps extending from the sitting surface, wherein the sitting surface, the first mounting portion, and the plurality of straps are defined by the first material, the plurality of straps further includes the second material fastened to the first material, and the sitting surface further includes the third material fastened to the first material.

In another example of an embodiment, the method includes the step of cutting the laminate structure by a die cutting process.

In another example of an embodiment, the second material is adhesively fastened to the first material, and the third material is adhesively fastened to the first material.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
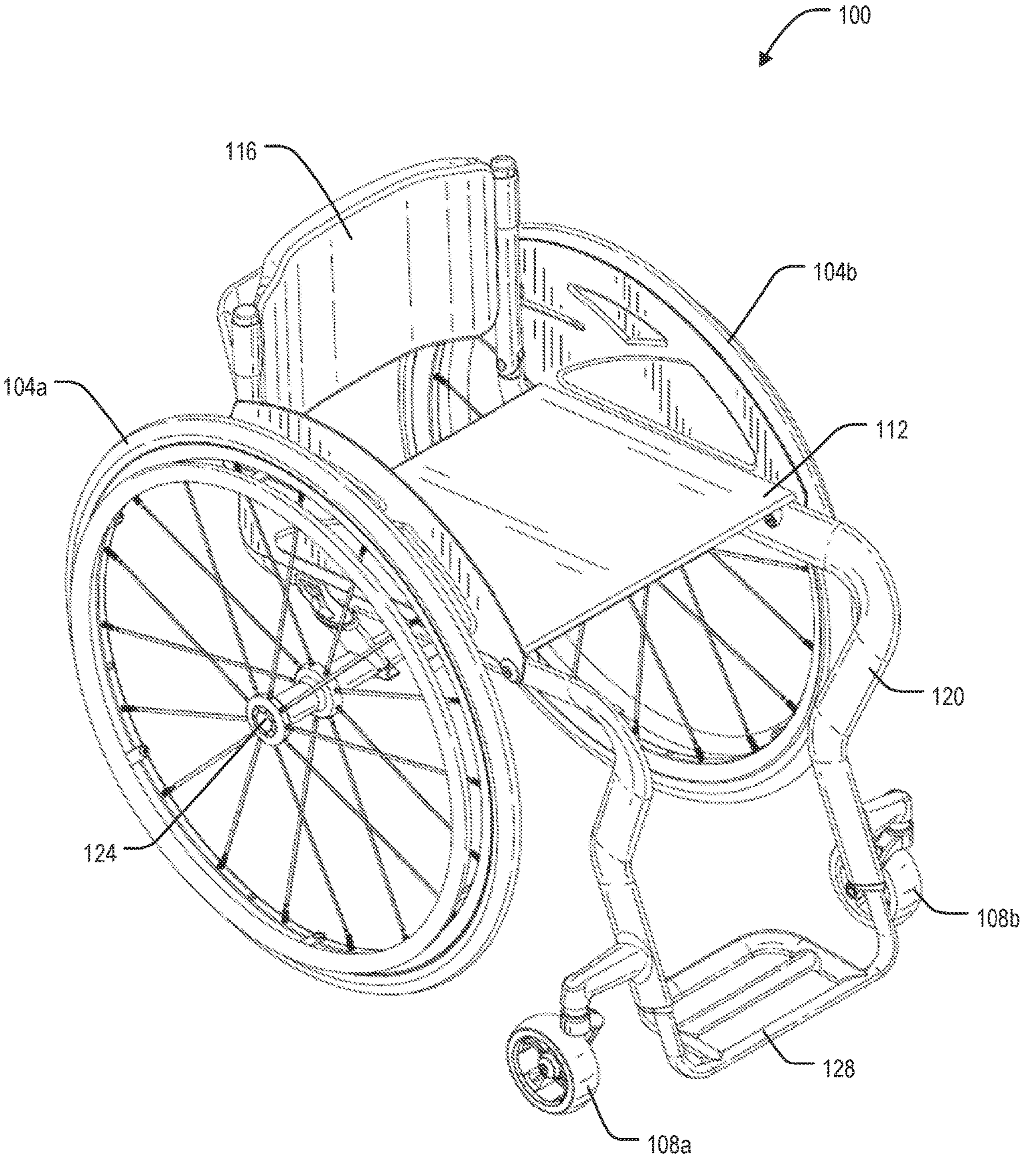
FIG. 1 is a perspective view of an example of an embodiment of a wheelchair.

With reference to FIG. 1, an embodiment of a wheelchair 100 is illustrated. The wheelchair 100 includes a pair of rear wheels 104*a*, 104*b* (also referred to as drive wheels 104*a*, 104*b* or first wheels 104*a*, 104*b*), a pair of caster wheels 108*a*, 108*b* (also referred to as second wheels 108*a*, 108*b*), a seat support 112 (also referred to as a seat assembly 112), a back support 116, a frame 120, an axle 124, and a foot support 128. Each drive wheel 104*a*, 104*b* is coupled to the axle 124. The axle 124 is adjustably fastened to the frame 120. Each caster wheel 108, 108*a* is fastened to the frame 120. The seat support 112, back support 116, and foot support 128 are respectively coupled (or fastened) to the frame 120. In other examples of embodiments, the wheelchair 100 can include a pair of foot supports (not shown) connected to the frame 120 that are each configured to support a respective foot of the user. It should be appreciated that the wheelchair 100, or one or more components thereof, can be formed of aluminum, titanium, steel, a metal alloy, carbon fiber, or any other suitable material. In addition, while the wheelchair 100 is illustrated as a manual wheelchair, in other examples of embodiments, the wheelchair 100 can be any suitable type of wheelchair, including, but not limited to, a powered wheelchair, a manual wheelchair, a collapsible wheelchair, etc. It should be appreciated that the illustrated example of the seat support 112 is a seat pan 112.

Figure 2:
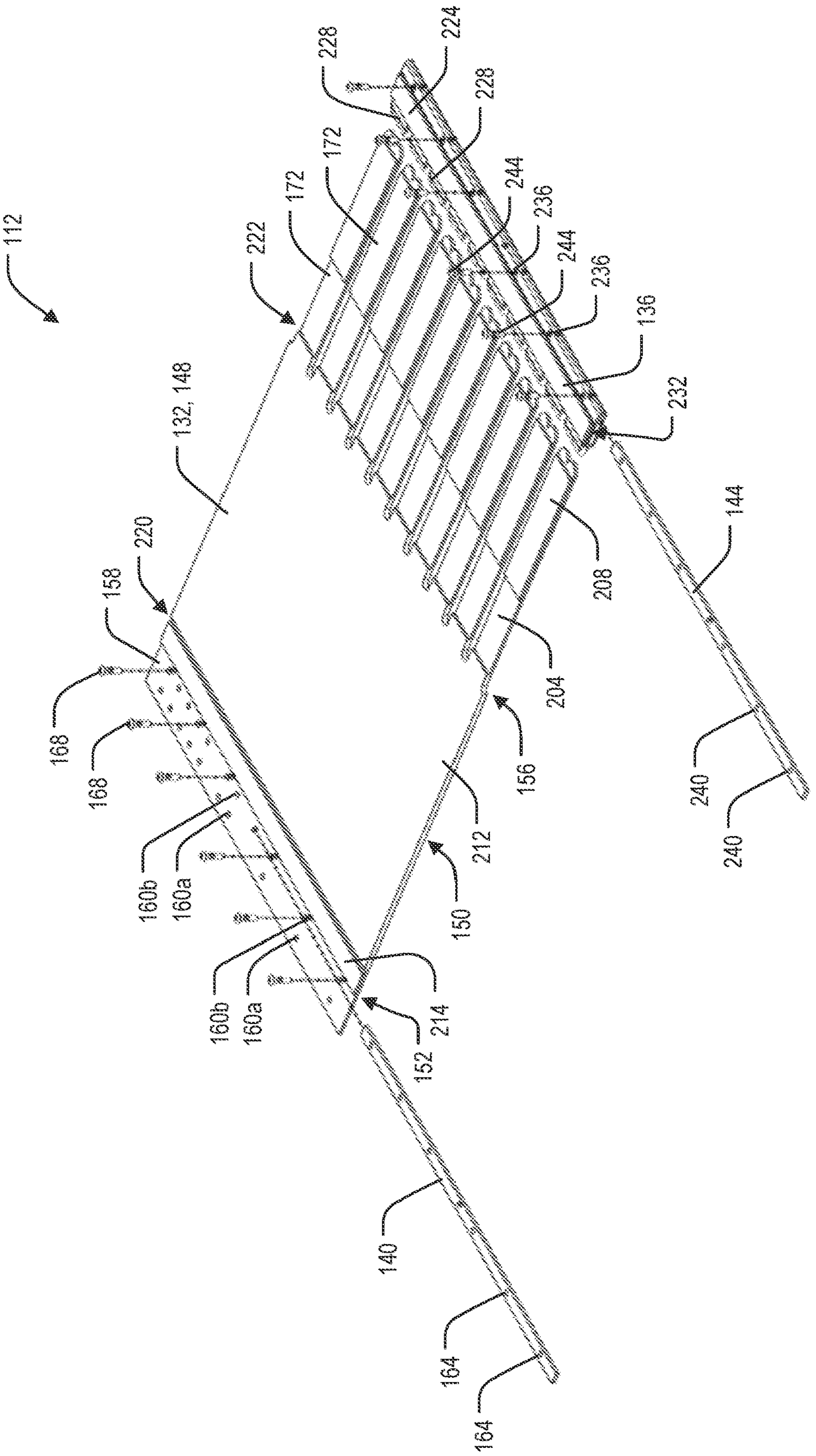
FIG. 2 is an exploded perspective view of a seat support of the wheelchair of FIG. 1.
Figure 3:
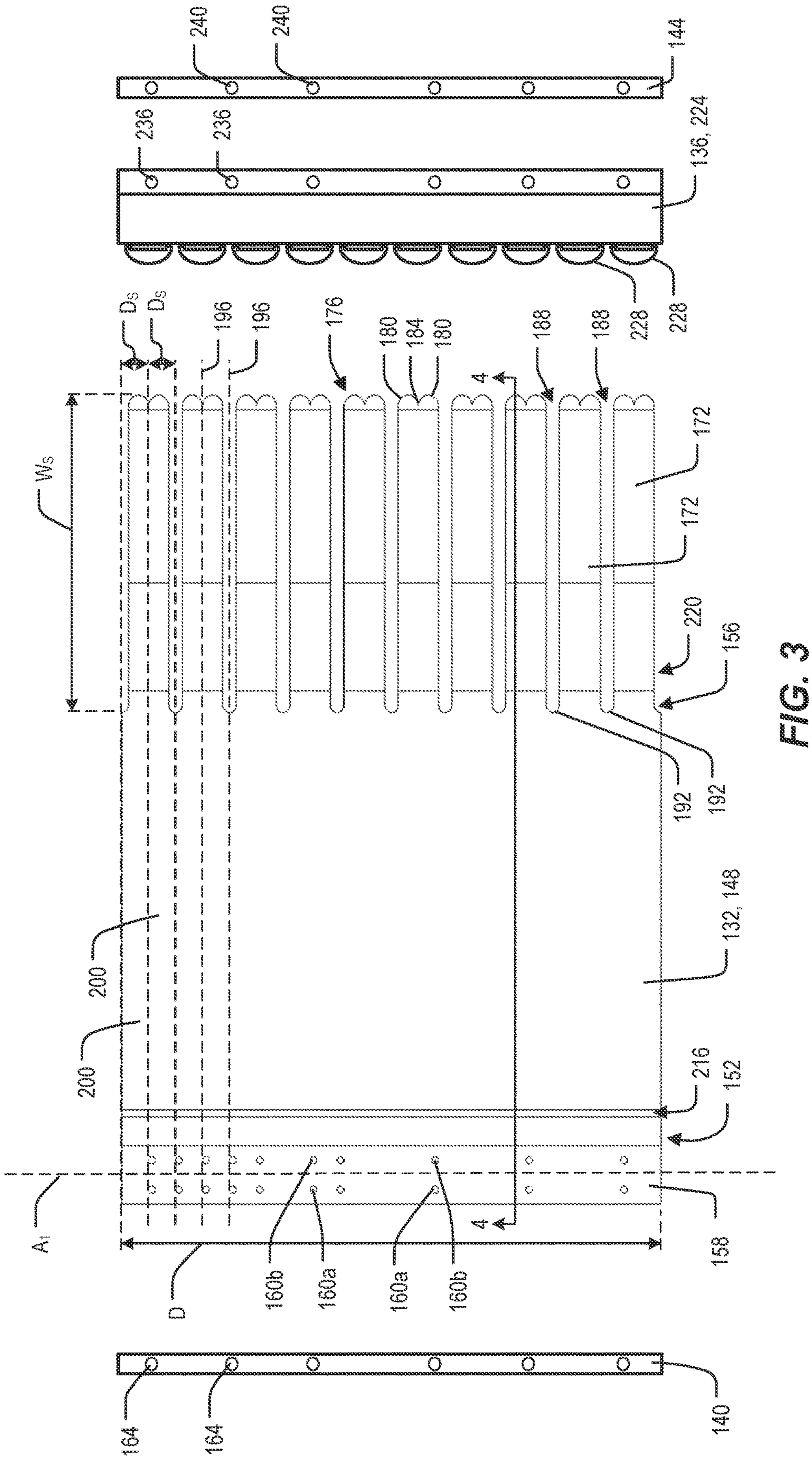
FIG. 3 is an exploded top view of the seat support of FIG. 2.

With reference now to FIGS. 2 and 3, as an alternative to the seat pan, the seat support 112 can be a seat sling assembly 112 (or a sling seat assembly 112). The seat sling assembly 112 includes a seat sling 132, a width adjustment mount 136, a first mounting rail 140, and a second mounting rail 144. The seat sling 132, which also referred to as a sling seat 132 or a sling 132, includes a sitting surface 148 (also referred to as a first side surface 148) opposite a bottom surface 150 (also referred to as a second side surface 150) (shown in FIG. 2). The seat sling 132 also includes a first edge 152 opposite a second edge 156. The seat sling 132 defines a seat depth D (shown in FIG. 3). The seat depth D can be measured in a direction parallel to the first edge 152.

The seat sling 132 includes a first connection portion 158 adjacent the first edge 152. The first connection portion 158 can also be referred to as a first mounting portion 158. The first connection portion 158 is positioned adjacent to the sitting surface 148 of the seat sling 132 such that it defines a first edge of the sitting surface 148. More specifically, the first connection portion 158 is defined by the seat sling 132 (or is integrally formed or unitary with the seat sling 132). The first connection portion 158 includes a plurality of first connection apertures 160*a* and a plurality of second connection apertures 160*b*. The first connection apertures 160*a* are aligned with each other in a first direction. Similarly, the second connection apertures 160*b* are aligned with each other in the first direction. Each first connection aperture 160*a* is aligned with a corresponding second connection aperture 160*b* in a second direction perpendicular to the first direction. This orientation allows the first connection portion 158 to form a pocket in response to folding upon itself. More specifically, the connection portion 158 can be folded such that the first portion of the first connecting portion 158 is folded toward the second edge 156 (or towards the sitting surface 148), folding onto a second portion of the first connecting portion 158. The first connection portion 158 is configured to fold along a first axis A1. The first axis A1 defines an axis of symmetry relative to the first and second connection apertures 160*a*, 160*b*. Thus, the first and second connection apertures 160*a*, 160*b* are configured to respectively align in response to folding of the first connection portion 158 along the first axis A1. The pocket formed by folding of the first connection portion 158 is configured to receive the first rail 140. The first rail 140 includes a plurality of first rail apertures 164. Each first rail aperture 164 is configured to align with an aligned pair of first and second connection apertures 160*a*, 160*b*. More specifically, each first rail aperture 164 is sandwiched between aligned first and second connection apertures 160*a*, 160*b* A plurality of first fasteners 168 (shown in FIG. 2) are configured to fasten the seat sling assembly 112 to the wheelchair 100. Each first fastener 168 is configured to extend through the aligned first connection aperture 160*a*, first rail aperture 164, and second connection aperture 160*b*. Once received by the aligned first connection aperture 160*a*, first rail aperture 164, and second connection aperture 160*b*, the first fastener 168 is received by an aperture defined by the frame 120 of the wheelchair 100 (shown in FIG. 1). The first fasteners 168 can be screws, bolts, or any other suitable threaded fastener for selectively (or removably) fastening the seat sling assembly 112 to one side member of the wheelchair frame 120. As such, the aperture defined by the frame 120 can be a threaded aperture configured to receive the threaded fastener.

With reference now to FIG. 3, the seat sling 132 includes a plurality of straps 172. The straps 172 extend from the second edge 156 of the sitting surface 148. Each strap 172 includes a strap end 176 opposite the sitting surface 148. In the illustrated embodiment, each strap end 176 includes a pair of arcuate portions 180 separated by a recessed slot 184. The arcuate portions 180 are identically shaped on each side of the slot 184. In other embodiments, each strap end 176 can include a single arcuate portion, a flat portion, or any other suitable end geometry. An elongated channel 188 (also referred to as a gap 188) is positioned between each adjacent strap 172. Each channel 188 includes a concave portion 192 adjacent the second edge 156 of the sitting surface 148. The concave portion 192 can, for example, prevent ripping (or tearing) of the second edge 156 of the sitting surface 148. The slots 184 and concave portions 192 define imaginary dividing lines 196. Stated another way, each slot 184 defines one imaginary dividing line 196, and each concave portion 192 defines another imaginary dividing line 196. The imaginary dividing lines 196 extend between the first edge 152 of the sitting surface 148 and the strap end 176. The imaginary dividing lines 196 are oriented transverse (or perpendicular) to the first edge 152. The imaginary dividing lines 196 are configured to divide (or separate) the seat sling 132 into a plurality of segments 200. Each segment 200 defines a segment depth $D_S$. The segment depths $D_S$ are measured perpendicular to the imaginary dividing lines 196. The segment depth $D_S$ can be, for example, one (1) inch, two (2) inches, or any other suitable distance (or associated width). During customization, the seat sling 132 is configured to be cut along one of the dividing lines 196 to adjust the seat depth D of the seat sling 132 by the associated segment depth $D_S$. The manufacturing and associated customization of the seat sling 132 is described in further detail below.

Figure 4:
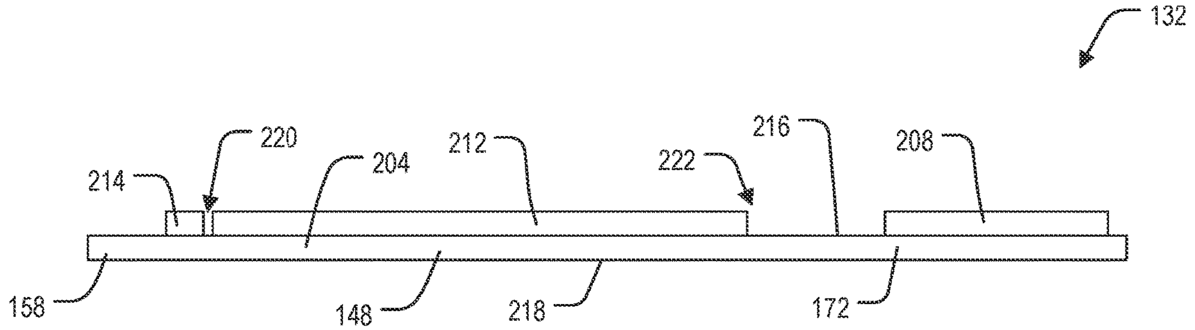
FIG. 4 is a cross-sectional view of a seat sling of the seat support taken along line 4-4 of FIG. 3.

With reference now to FIGS. 2 and 4, the seat sling 132 includes a laminated structure. The seat sling 132 includes a base layer 204 (also referred to as a substrate layer 204 or a first material 204). The base layer 204 can define a shape of the seat sling 132. The base layer 204 is configured to not shear, fracture, or plastically deform from a maximum load in a direction perpendicular to the base layer 204. The maximum load can be, for example, three hundred fifty (350) pounds, four hundred (400) pounds, or any other suitable load to support a user of the wheelchair 100. The base layer 204 is also configured to not fray when cut, sliced, or trimmed. The base layer 204 has a high surface energy to, for example, allow an adhesive to wet-out over the base layer 204 (or spread across the base layer 204). The base layer 204 is configured to be radio-frequency (RF) welded or hot-air welded. The base layer 204 is further configured to be waterproof and resistant to dirt, mildew, oil, salt, chemicals, and ultraviolet (UV) light. The base layer 204 can be, for example, formed of vinyl coated polyester (VCP). A first accessory portion 208 (also referred to as a first fastener portion 208) and a second accessory portion 212 (also referred to as a second fastener portion 212) are coupled to the base layer 204. The first and second accessory portions 208, 212 can be coupled to the base layer 204 by, for example, an adhesive or a plurality of fasteners. The first accessory portion 208 is coupled to the base layer 204 on each strap 172 adjacent the strap ends 176. A portion of the sitting surface 148, up to and including the majority, includes the second accessory portion 212. In addition, the second accessory portion 212 can be coupled to a portion of each strap 176. The second accessory portion 212 is positioned between the first accessory portion 208 and the first connection portion 158. The first accessory portion 208 is formed of a second material, and the second accessory portion 212 is formed of a third material. The second and third materials are configured to selectively attach together to form a self-fastening attachment assembly. For example, the first and second materials can be a hook-and-loop fastening material (e.g., Velcro, etc.). In the illustrated embodiment, the second material is a hook material, and the third material is a loop material. It should be appreciated that the hook material includes a plurality of hooks, and the loop material includes a plurality of loops. The plurality of hooks are configured to be removably connected (or coupled or fastened) to the plurality of loops to adjust a width W of the seat sling 132 (shown in FIG. 5), which is described in additional detail below. In other examples of embodiments, the first accessory portion 208 can include the loop material, and the second accessory portion 212 can include the hook material. In yet other embodiments, the first and second accessory portions 208, 212 can be any suitable material configured to be removably coupled to each other to form a self-attachment assembly, such as, but not limited to, snap fasteners, hook-and-eye closures, buttons, etc. It should be appreciated that the first and second accessory portions 208, 212 are configured to cooperate to form an adjustable (or removable or selective) self-fastening attachment assembly.

The illustrated seat sling 132 also includes a third accessory portion 214. The third accessory portion 214 is positioned between the first connection portion 158 and the second accessory portion 212. The third accessory portion 214 can be composed of the first material, the second material, the third material, VCP, of any other suitable material. The third accessory portion 214 can be a reinforcing material positioned between the first connection portion 158 and the sitting surface 148.

With specific reference now to FIG. 4, the first, second, and third accessory portions 208, 212, 214 are positioned on an upper side 216 (or a top side 216) of the base layer 204. As such, the user is configured to sit on the second and third accessory portions 212, 214. In other examples of embodiments, the first, second, and third accessory portions 208, 212, 214 can be positioned on a lower side 218 (or a bottom side 218) of the base layer 204. The lower side 218 is opposite the upper side 216 of the base layer 204. In these embodiments, the user is not configured to sit on the accessory portions 212, 214, or the straps 172. In yet other examples of embodiments, a seat pad (not shown) can be coupled to, for example, the second accessory portion 212. The seat pad can, for example, include the hook material and couple to the loop material of the second accessory portion 212. The seat pad can mitigate any height variations of the sitting surface 148 caused by the straps 172 being coupled to a portion of the second accessory portion 212. A user can then sit on the seat pad, which includes a flat sitting surface (not shown).

With continued reference to FIGS. 2 and 4, the seat sling 132 includes a first compression channel 220 and a second compression channel 222. The illustrated first compression channel 220 is positioned between the first connection portion 158 and the second accessory portion 212. More specifically, the first compression channel 220 is positioned between the second and third accessory portions 212, 214. The second compression channel 222 is positioned between the first accessory portion 208 and the second accessory portion 212. The first and second compression channels 220, 222 provide a clearance gap for the seat sling 132 to bend. For example, during operation, the wheelchair user applies a body weight load upon the seat sling 132 in a direction perpendicular to the seat sling 132. The load causes the seat sling 132 to bend, such that the sitting surface 148 can be positioned below (or is offset from) the first connection portion 158 and the straps 172. The first and second compression channels 220, 222 provide space for the laminate material of the seat sling 132 to bend to prevent unnecessary wear forces on the seat sling 132.

With reference back to FIGS. 2 and 3, the width adjustment mount 136 includes a base 224 and a plurality of rings 228 coupled to the base 224. The width adjustment mount 136 can also be referred to as a second mounting portion 136. The rings 228 are illustrated as D-rings. However, in other embodiments, the rings 228 can be webbing slides, loops, or any suitable aperture configured to receive one of the straps 172. The illustrated rings 228 are pivotably coupled to the base 224. Stated another way, each ring 228 is configured to independently pivot relative to the base 224. In other embodiments, the rings 228 can be fixedly coupled to the base 224. It should be appreciated that the width adjustment mount 136 is a component that is separate and distinct from the seat sling 132.

Figure 5:
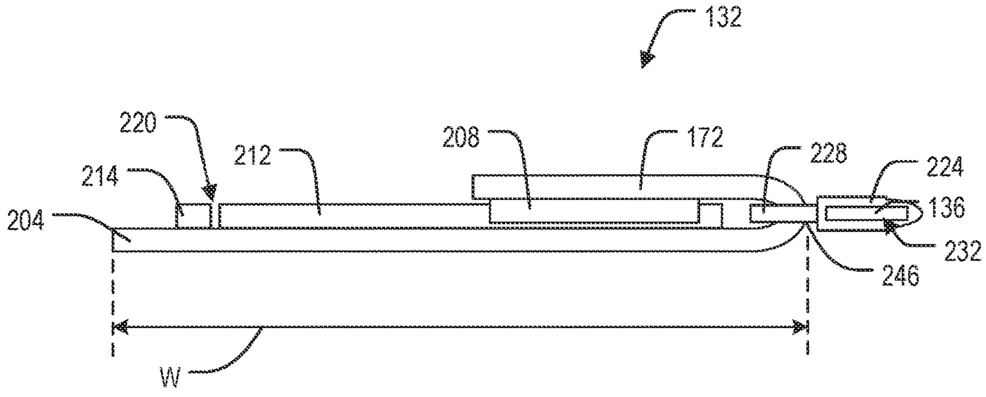
FIG. 5 is an end view of the seat sling of FIG. 3 shown in removable engagement with a mount of the seat support.

Each ring 228 is configured to receive a respective strap 172 (as shown in FIG. 5) of the seat sling 132. The base 224 includes (or defines) an internal cavity 232. The illustrated cavity 232 is an opening extending through an entire length of the base 224. In other embodiments, the cavity 232 can extend only through a portion of the base 224. The base 224 also includes a plurality of base apertures 236. The base apertures 236 extend through the base 224. The second rail 144 includes a plurality of second rail apertures 240. The second rail apertures 240 have the same pattern as the base apertures 236. In addition, the second rail 144 is substantially the same as the first rail 140. The second rail 144 is configured to be received by the cavity 232. More specifically, the second rail 144 is configured to be received in the cavity 232 such that each second rail aperture 240 is aligned with one respective base aperture 236. A plurality of second fasteners 244 (shown in FIG. 2) are configured to fasten the width adjustment mount 136 to the wheelchair 100. Each second fastener 244 is configured to extend through one of the aligned base apertures 236 and second rail apertures 240. Once received by the respective aligned aperture 236, 240, the second fastener 244 is received by an aperture defined by the frame 120 of the wheelchair 100 (shown in FIG. 1). The second fasteners 244 can be screws, bolts, or any other suitable threaded fastener for selectively (or removably) fastening the seat sling assembly 112 to the other side member of the wheelchair frame 120. As such, the aperture defined by the frame 120 can be a threaded aperture configured to receive the threaded fastener.

With reference to FIG. 5, the width W (also referred to as a desired width W of a first width W) of the seat sling 132 is defined between the first edge 152 and a fold point 246 on each strap 172. Each fold point 246 is an imaginary point determined by a user. More specifically, a user can insert each strap 172 through one respective ring 228 and couple the first accessory portion 208 to a desired position on the second accessory portion 212. This facilitates the self-fastening connection of each strap 172 to the base layer 204. The fold points 246 are then defined as the position on each strap 172 that contacts (or abuts) the respective ring 228. The width W can be adjustable by and suitable distance, for example, by approximately three inches, by approximately four inches, by at least approximately two inches, by at least approximately three inches, or by any suitable or desired distance. In one example of an embodiment, the width W can be adjustable from a total width of approximately ten inches to approximately thirteen inches (10 to 13 inches), from a total width of approximately fourteen inches to approximately sixteen inches (14 to 16 inches), from a total width of approximately seventeen inches to approximately nineteen inches (17 to 19 inches), or from a total width of approximately twenty inches to approximately twenty-two inches (20 to 22 inches). The adjustability of the width W depends on a length of a strap width $W_S$ of the straps 172 (shown in FIG. 3). As such, the longer the strap width $W_S$, the greater the adjustability of the seat sling width W. It should also be appreciated that adjustment of the width W by removable engagement of each strap 172 with the seat sling 132 can also facilitate adjustment of the tension on the seat sling 132 when mounted between side frame members of the wheelchair 100.

Figure 6:
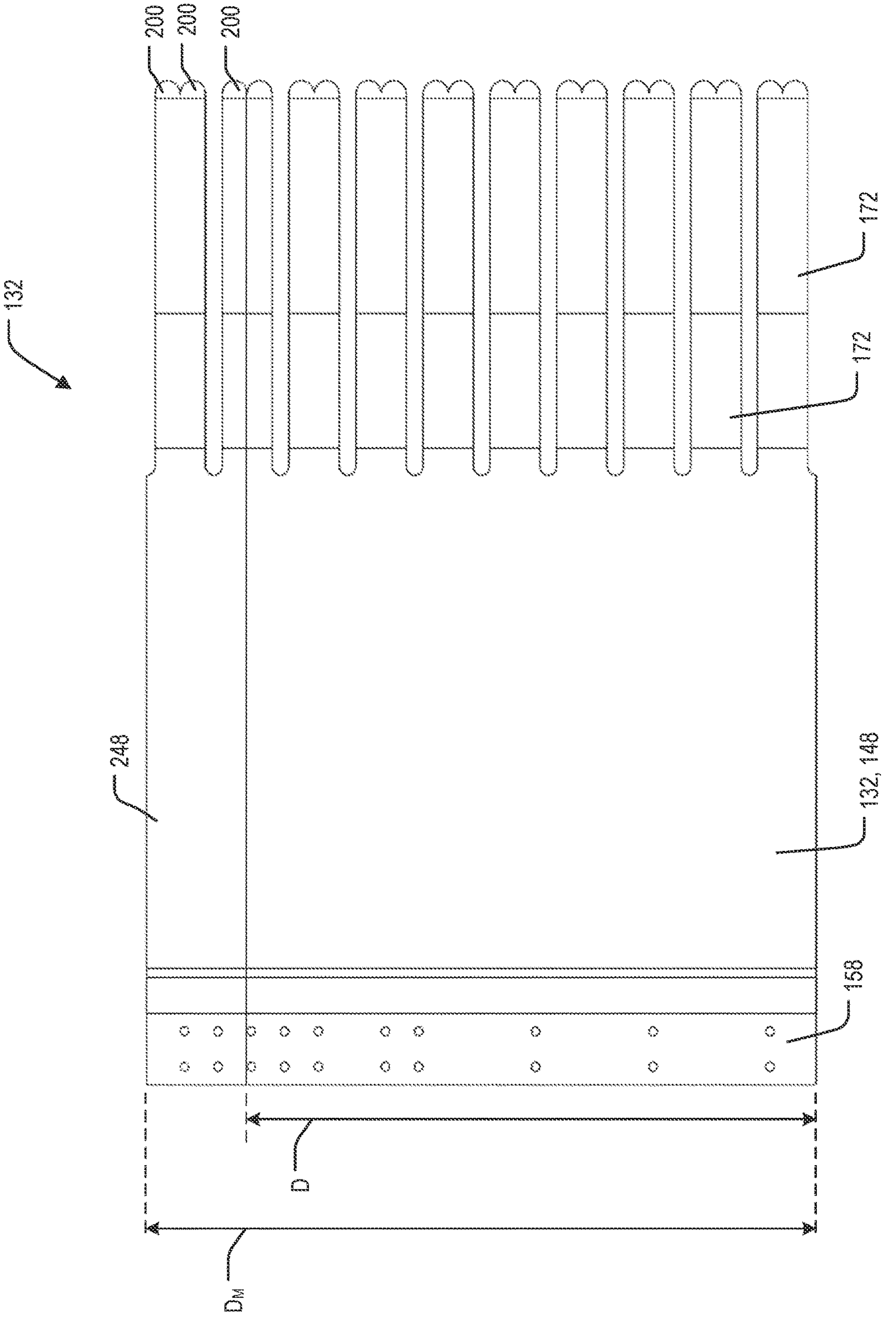
FIG. 6 is a top plan view of the seat sling of FIG. 3 illustrating a manufactured depth relative to an example of a customized desired depth.

With reference to FIG. 6, the seat sling 132 is produced to have a manufactured depth $D_M$. The manufactured depth $D_M$ can be, for example, a maximum desired or required depth. The manufactured depth $D_M$ can also be referred to as a first depth $D_M$. Stated another way, if a manufacturer produces many seat slings 132 ranging from a depth of, for example, ten (10) inches to twenty (20) inches, the manufactured depth $D_M$ can be twenty (20) inches. The manufactured depth $D_M$ can be twenty inches, eighteen inches, sixteen inches, at least sixteen inches, at least eighteen inches, or any suitable depth of the seat sling 132. In the illustrated embodiment, the manufactured depth $D_M$ is equal to twenty (20) inches, and the seat sling 132 has twenty (20) segments 200. Each segment 200 has a segment depth $D_S$ (shown in FIG. 3) of approximately one (1) inch. One or more segments 200 can then be trimmed, cut, sliced, or permanently removed from the seat sling 132 to customize the seat depth D (also referred to as a desired depth D or a target depth D or a second depth D). The segments 200 can be cut by, for example, a rotary die, a flatbed die, a laser cutter, waterjets, shears, or any other suitable cutting or perforating device. The segments 200 removed from the seat sling 132 define a removed portion 248 (also referred to as a waste portion 248). The removed portion 248 can then be recycled or disposed of. As a non-limiting example, in the illustrated embodiment, the desired depth D is seventeen (17) inches, such that the removed portion 248 includes three (3) segments 200. In other examples of embodiments, the desired depth D can be any suitable depth equal to or less than the manufactured depth $D_M$.

Figure 7:
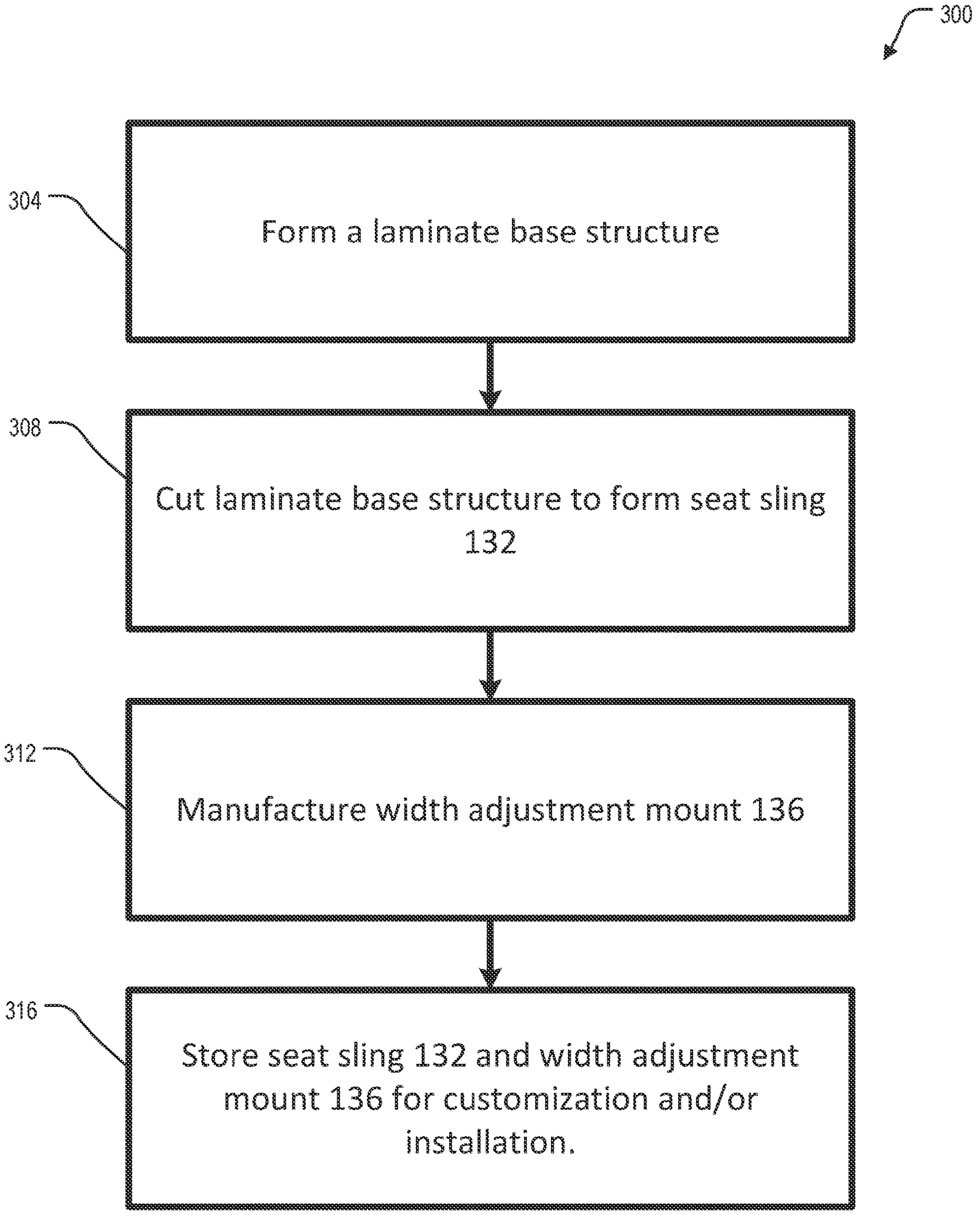
FIG. 7 is a flow diagram proving an example of a process of manufacturing the seat support of FIG. 2.

FIG. 7 illustrates an example of a process of manufacturing a seat sling 300. The process 300 includes a plurality of instructions or steps that are depicted in flow diagram form. The process 300 begins at step 304, where a laminate structure is formed. For example, the base layer 204 of the seat sling assembly 112 can be formed of vinyl coated polyester (VCP). The first accessory portion 208 (e.g., hook material, loop material, etc.) can be adhesively fastened to a first portion of the base layer 204. The second accessory portion 212 (e.g., loop material, hook material, etc.) can be adhesively fastened to a second portion of the base layer 204. The second portion being a different portion (or area) than the first portion. As an example, the first and second accessory portions 208, 212 can be fastened using a pressure-sensitive adhesive. After the lamination process in step 304, the laminate structure proceeds to step 308. Alternatively, the laminate structure can be stored for later processing at step 308. For example, the laminate structure can be wound into a roll form and stored (or transported to a separate location for processing at step 308).

At step 308, the laminate structure is cut into the seat sling 132. In one example of an embodiment, a continuous cutting process includes a die. In one example of an embodiment, the die can be a flatbed die cutter. In another example of an embodiment, the die can be a rotary die, or any other system suitable to cut the laminate structure. The die is configured to cut the laminate structure to form the seat sling 132. For example, the die can cut to form the first and second connection apertures 160*a*, 160*b*, a perimeter of the seat sling 132, and a perimeter of the plurality of straps 172. The perimeter of the plurality of straps 172 can include cutting each channel 188, and optionally the arcuate portions 180 and recessed slot 184. Alternatively, in other examples of embodiments, the die cutting process of step 308 to form the seat sling 132 can be performed by a cut and sew operation. It should be appreciated that one or more differently sized dies can be utilized to form seat slings 132 having different manufactured depths $D_M$ and/or different manufactured widths W. Accordingly, the different sized dies can form seat slings 132 having different numbers of segments 200.

Next at step 312, the width adjustment mount 136 is manufactured. The width adjustment mount 136 can be die cut from the same material as the base layer 204 (e.g., vinyl coated polyester (VCP)). The die cut can be by flatbed die cutter, rotary disc, or any other suitable cutting system. The material used to manufacture the width adjustment mount 136 can also be taken from the laminate structure formed at step 304. Once cut to form the base 224 and the apertures 236, the plurality of rings 228 can be attached to the base 224. The cavity 232 can also be formed within the base 224. It should be appreciated that the cutting portion of step 312 can occur concurrently with step 308. In other embodiments, step 312 can occur prior to steps 304 and/or 308, or after step 308.

At step 316, the seat sling 132 and the width adjustment mount 136 are manufactured. Both components 132, 136 can be stored for later customization and/or installation.

Figure 8:
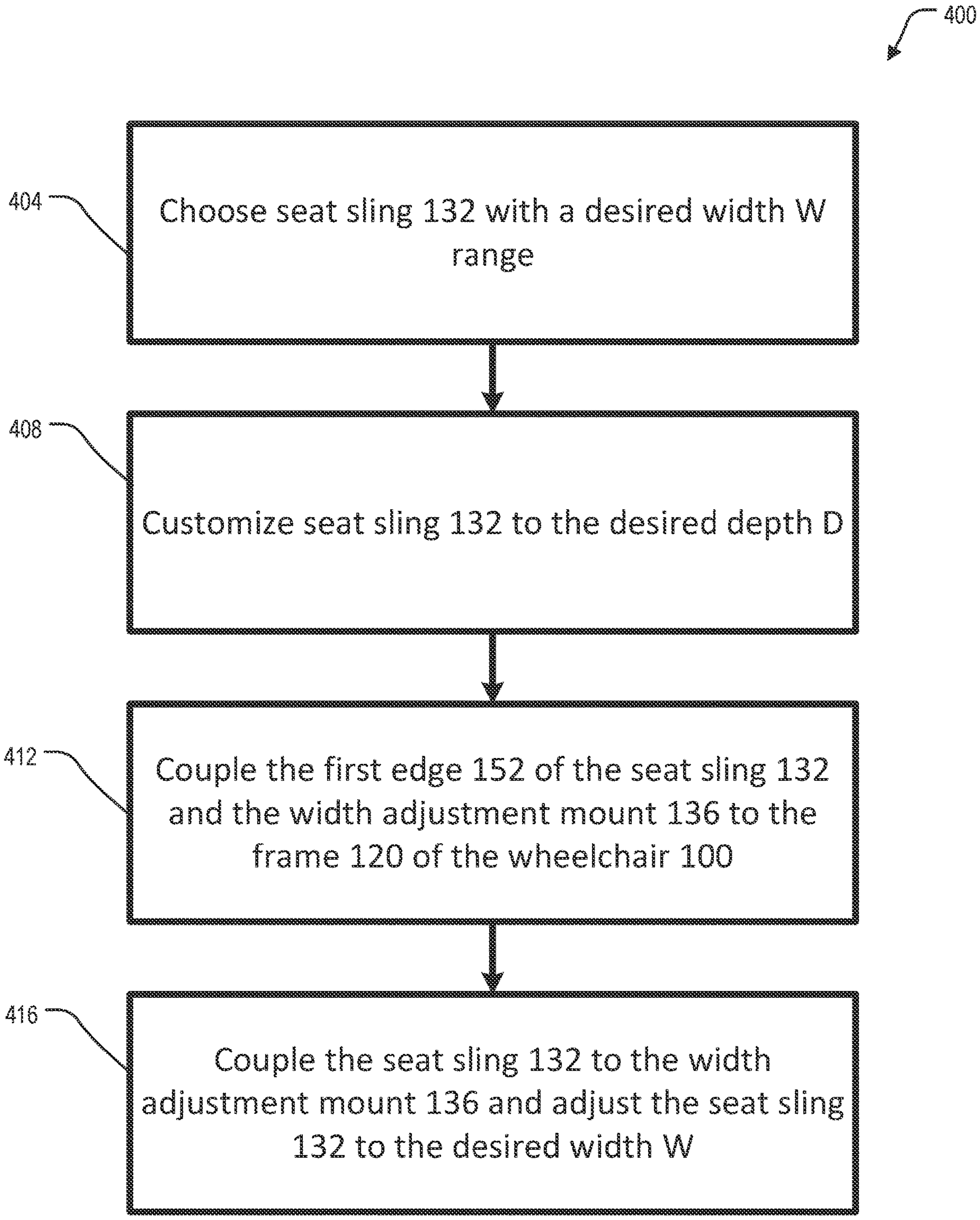
FIG. 8 is a flow diagram providing an example of a process for customization and assembly of the seat support of FIG. 2.

With reference now to FIG. 8, an example of a process for customizing and assembling a customized seat sling 400 is illustrated. The process 400 utilizes the seat sling 132. The process 400 includes a plurality of instructions or steps that are depicted in flow diagram form. The process 400 begins at step 404, where a seat sling 132 with a desired width W range is selected. For example, one of a plurality of different seat slings 132 having different width W ranges can be selected. For example, one of four different width W ranges can be selected from a width W of 10 to 13 inches, 14 to 16 inches, 17 to 19 inches, and 20 to 22 inches, respectively. The seat sling 132 is selected that includes the desired (or target) width. As a non-limiting example, if a seat sling 132 having a width of eighteen inches is desired, the seat sling 132 having a width W range of 17 to 19 inches is selected.

Next, at step 408, the seat sling 132 is customized from the manufactured depth $D_M$ to the desired depth D. For example, if the desired depth D is less than the manufactured depth $D_M$, the seat sling 132 can be cut (or trimmed) to the desired depth D. As a nonlimiting example, in an embodiment where the manufactured depth $D_M$ is twenty (20) inches, and the desired depth D is eighteen (18) inches, two inches depth is removed. More specifically, one or more segments 200 are removed to reach the desired depth D from the manufactured depth $D_M$. Continuing the nonlimiting example, if each segment 200 has a segment depth $D_S$ equal to one (1) inch, removing two (2) segments 200 results in a reduction of two inches of width from the manufactured depth $D_M$ to the desired depth D. In another example of an embodiment, the desired depth D can be equal to the manufactured depth $D_M$. In this embodiment, no cutting (or trimming) is necessary. It should be appreciated that in embodiments requiring cutting (or trimming) any suitable number of segments 200 can be removed to achieve a desired depth D.

Next, at step 412, the first edge 152 of the sitting surface 148 and the width adjustment mount 136 are coupled to the frame 120 of the wheelchair 100. In one embodiment, to couple the first edge 152 of the seat sling 132 to the frame 120, the first rail 140 is positioned on the first connection portion 158 with each first rail aperture 164 aligned with one respective second connection aperture 160*b*. The first connection portion 158 is then folded over the first rail 140, such that each first rail aperture 164 is aligned with one respective first connection aperture 160*a* and one respective second connection aperture 160*b*. Each first fastener 168 is then inserted through one first connection aperture 160*a*, one first rail aperture 164, and one second connection aperture 160*b* and into the frame 120. The first edge 152 of the seat sling 132 is then coupled to the frame 120 (or coupled to a first frame member of the wheelchair 100). To couple the width adjustment mount 136 to the frame 120, the second rail 144 is positioned within the cavity 232 of the base 224, such that each second rail aperture 240 is aligned with one respective base aperture 236. Each second fastener 244 is then inserted through one base aperture 236 and one second rail aperture 240 and into the frame 120 (or coupled to a second frame member of the wheelchair 100). The width adjustment mount 136 is coupled to the frame 120.

Next, at step 416, the seat sling 132 is coupled to the width adjustment mount 136 and adjusted to the desired width W. Each strap 172 is inserted into one respective ring 228. Once received through each ring 228, each strap 172 is then pulled in a direction away from the ring 228 (i.e., toward the first edge 152 of the sitting surface 148). The straps 172 are pulled to a desired position to achieve the desired width W. Stated another way, each strap 172 is pulled to a position at which the fold point 246 contacts the respective ring 228. A user can then engage each strap 172 with the sitting surface 148 to couple the first and second accessory portions 208, 212 together. In response to the first and second accessory portions 208, 212 being positioned into engagement, the straps 172 are self-fastened to the sitting surface 148 (or the seat sling 132). Once the self-fastened to achieve the desired width W, the seat sling 132 is mounted to the wheelchair 100. The wheelchair user can then sit on the seat sling 132.

At any time, the user may desire to adjust the width W. To adjust the width W, the user can apply a force on each strap 172 (e.g., pull each strap 172) to disengage (or separate) the first and second accessory portions 208, 212. The user can then move or otherwise adjust the straps 172 to a newly desired position. The first and second accessory portions 208, 212 can then be coupled together (or reengage) to self-fasten and achieve the new desired width W.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A sling seat assembly for a wheelchair comprising:

a sling including a sitting surface, a first mounting portion positioned adjacent to the sitting surface, and a plurality of straps extending from an edge of the sitting surface; and a second mounting portion includes a plurality of rings, wherein the sling is formed of a laminate structure such that the sitting surface, first mounting portion, and the plurality of straps are defined by a first material, the plurality of straps further includes a second material fastened to the first material, and the sitting surface includes a third material fastened to the first material, the first, second and third materials being different materials, and wherein in response to the sling being attached to the wheelchair, each strap of the plurality of straps is configured to be received by one of the plurality of rings and removably fasten to a respective portion of the sitting surface.

2. The sling seat of claim 1, wherein the first mounting portion is defined by the sling.

3. The sling seat of claim 1, wherein the first mounting portion defines a pocket configured to receive a first mounting rail.

4. The sling seat of claim 3, wherein the pocket is defined by a first portion of the first mounting portion folding onto a second portion of the first mounting portion.

5. The sling seat of claim 1, wherein the first mounting portion defines a plurality of connection apertures, and a first mounting rail defines a plurality of rail apertures, each rail aperture is configured to align with one of the plurality of connection apertures and receive a fastener configured to engage a frame member of the wheelchair.

6. The sling seat of claim 1, wherein the second mounting portion defines a cavity configured to receive a second mounting rail.

7. The sling seat of claim 6, wherein the second mounting portion defines a plurality of connection apertures, and the second mounting rail defines a plurality of rail apertures, each rail aperture is configured to align with one of the plurality of connection apertures and receive a fastener configured to engage a frame member of the wheelchair.

8. The sling seat of claim 1, wherein the second material is configured to removably attach to the third material to removably fasten each strap to the sitting surface.

9. The sling seat of claim 1, wherein the first material is vinyl coated polyester.

10. The sling seat of claim 9, wherein the second material is one of a hook or loop material, and the third material is the other of the loop or hook material.

11. The sling seat of claim 1, wherein the second material is adhesively fastened to the first material, and the third material is adhesively fastened to the first material.

12. The sling seat of claim 1, wherein the first mounting portion is positioned on a first edge of the sitting surface and the edge is a second edge of the sitting surface, opposite the first edge.

13. The sling seat of claim 1, wherein the sling defines a first depth, and each strap defines a segment, the segments being oriented perpendicular to the first depth, each segment including a portion of the sitting surface and a portion of the first mounting portion.

14. The sling seat of claim 13, wherein each segment is configured to be permanently removed from the sling to reduce a depth of the sling.

15. The sling seat of claim 14, wherein in response to the permanent removal of each segment, the sling depth decreases from the first depth to a second depth.

16. The sling seat of claim 13, wherein each strap defines a plurality of segments.

17. The sling seat of claim 1, wherein the sling defines a width, the width is adjustable in response to a removably fastened position of each strap relative to the respective portion of the sitting surface.

18. The sling seat of claim 1, wherein in response to the sling being attached to the wheelchair, the first mounting portion is fastened to a first frame portion of the wheelchair and the second mounting portion is fastened to a second frame portion of the wheelchair.

19. A sling seat assembly for a wheelchair comprising:

a sling including:

a sitting surface having a first edge and a second edge;

a first mounting portion positioned along the first edge;

a plurality of straps extending from the second edge; and a second mounting portion including a plurality of apertures, wherein in response to the sling being attached to the wheelchair, each strap of the plurality of straps is configured to be received by one of the plurality of apertures and removably fastened to a respective portion of the sitting surface.

20. The sling seat assembly of claim 19, wherein the sling is formed of a laminate structure such that the sitting surface, first mounting portion, and the plurality of straps are defined by a first material, the plurality of straps includes a second material fastened to the first material, and the sitting surface includes a third material fastened to the first material, the first material, the second material, and the third material being different.

* * * * *